United States Patent
Martin et al.

(10) Patent No.: US 10,022,771 B2
(45) Date of Patent: Jul. 17, 2018

(54) METHOD FOR THE MANUFACTURING OF LAMINA WORK PIECES

(71) Applicant: NIDEC VAMCO CORPORATION, Pittsburgh, PA (US)

(72) Inventors: Vaughn H. Martin, Mars, PA (US); Byran P. Gentile, Longboat Key, FL (US); Joseph P. Gentile, Longboat Key, FL (US)

(73) Assignee: NIDEC VAMCO CORPORATION, Pittsburgh, PA (US)

( * ) Notice: Subject to any disclaimer, the term of this patent is extended or adjusted under 35 U.S.C. 154(b) by 0 days.

(21) Appl. No.: 15/503,885

(22) PCT Filed: Aug. 13, 2015

(86) PCT No.: PCT/US2015/045011
§ 371 (c)(1),
(2) Date: Feb. 14, 2017

(87) PCT Pub. No.: WO2016/025688
PCT Pub. Date: Feb. 18, 2016

(65) Prior Publication Data
US 2017/0274440 A1  Sep. 28, 2017

Related U.S. Application Data

(60) Provisional application No. 62/037,707, filed on Aug. 15, 2014, provisional application No. 62/037,762, filed on Aug. 15, 2014.

(51) Int. Cl.
*B21D 28/22*  (2006.01)
*H02K 15/02*  (2006.01)

(52) U.S. Cl.
CPC ............. *B21D 28/22* (2013.01); *H02K 15/02* (2013.01)

(58) Field of Classification Search
None
See application file for complete search history.

(56) References Cited

U.S. PATENT DOCUMENTS

| 2,958,464 | A |   | 10/1960 | Charron |            |
|-----------|---|---|---------|---------|------------|
| 4,023,788 | A | * | 5/1977  | Herb    | B21D 28/265 |
|           |   |   |         |         | 269/73     |

(Continued)

FOREIGN PATENT DOCUMENTS

JP        5136004        3/1976

OTHER PUBLICATIONS

Search Report for corresponding European Patent Application No. 15831842.8 dated Mar. 9, 2018.

*Primary Examiner* — Ghassem Alie
(74) *Attorney, Agent, or Firm* — Reed Smith LLP

(57) ABSTRACT

A method of notching lamina workpieces with a notching press system. The method includes moving a ram and an upper tooling section to an open position and inserting a lamina workpiece onto an indexing spindle, and then moving the ram and the upper tooling section to a closed position, producing a cut opening in the lamina workpiece between a punch and a first die opening. The press ram and the upper tooling section are then moved back to the open position and the index motor is rotated to position the cut opening of the workpiece over a second die opening. The torque applied to the index motor is then reduced, and the press ram and the upper tooling section are moved to an intermediate position so that the piloting device cooperates with the cut opening of the workpiece for angular positioning of the workpiece.

4 Claims, 7 Drawing Sheets

(56) References Cited

U.S. PATENT DOCUMENTS

| | | | |
|---|---|---|---|
| 4,285,259 A | | 8/1981 | Jelinek et al. |
| 5,333,525 A | * | 8/1994 | Schlegel ............... H02K 15/024 29/596 |
| 5,797,306 A | | 8/1998 | Kufahl |
| 5,911,806 A | * | 6/1999 | Bareis .................... B21D 28/22 29/598 |
| 5,970,832 A | | 10/1999 | Aizawa |
| 6,769,600 B1 | | 8/2004 | Knox et al. |
| 2002/0072456 A1 | * | 6/2002 | Ichikawa ............... B21D 28/12 483/1 |
| 2004/0154453 A1 | * | 8/2004 | Kobayashi ............. B21D 28/12 83/691 |
| 2009/0211326 A1 | * | 8/2009 | Laib ....................... B21D 28/12 72/332 |
| 2017/0361369 A1 | * | 12/2017 | Horii ..................... B21D 28/16 |

* cited by examiner

METHOD FOR THE MANUFACTURING OF LAMINA WORK PIECES

CROSS-REFERENCE TO RELATED APPLICATION

This application is a United States national stage of International Application No. PCT/US15/45011, filed Aug. 13, 2015, which published as International Publication No. WO 2016/025688, and which claims the benefit under 35 U.S.C. § 119(e) of the earlier filing date of U.S. Provisional Patent Application Nos. 62/037,707 and 62/037,762 filed on Aug. 15, 2014, which are hereby incorporated by reference.

BACKGROUND

The present invention relates to the production of a stamped lamina workpiece, and more specifically a rotated lamina workpiece produced in a notching type press machine. Such notching type press machines are well known in the art, as is the production of a rotated lamina workpiece produced therein. An example of a machine used for the production of a stamped lamina workpieces, and in particular a rotated lamina workpiece can be seen in International Application No. PCT/US14/24135 ("the '135 PCT Application") filed Mar. 12, 2014, the disclosure of which is incorporated by reference. The press machine of the '135 PCT Application discloses a servo motor for the rotation of the stamped lamina workpiece. The servo motor described is capable of positioning the lamina workpiece in a generally desired angular location. There exists, however, the need for a more accurate angular positioning of the stamped lamina workpiece than is possible by the servo motor. To overcome this limitation and others known in the art, an improved method for the manufacturing of lamina workpieces is described following:

BRIEF DESCRIPTION OF THE DRAWINGS

With reference to FIGS. 1-7, a notching press machine includes a stationary base 1, a generally depicted press 2 mounted to base 1 and arranged for sliding thereon, a generally depicted indexing spindle 3 mounted to base 1 for holding and indexing a workpiece 4. Index motor 5 is arranged for rotary movement of spindle 3 and workpiece 4 attached thereto. Index motor 5 is preferably an electric servo motor capable of a general angular positioning of workpiece 4. The generally depicted press 2 comprises a frame 6 and a press ram 7 (FIG. 2) supported by press frame 6 and arranged for sliding movement in a linear direction parallel to the rotational axis of indexing spindle 3. Similarly arranged notching press machines are well known in the art.

Figure 1:
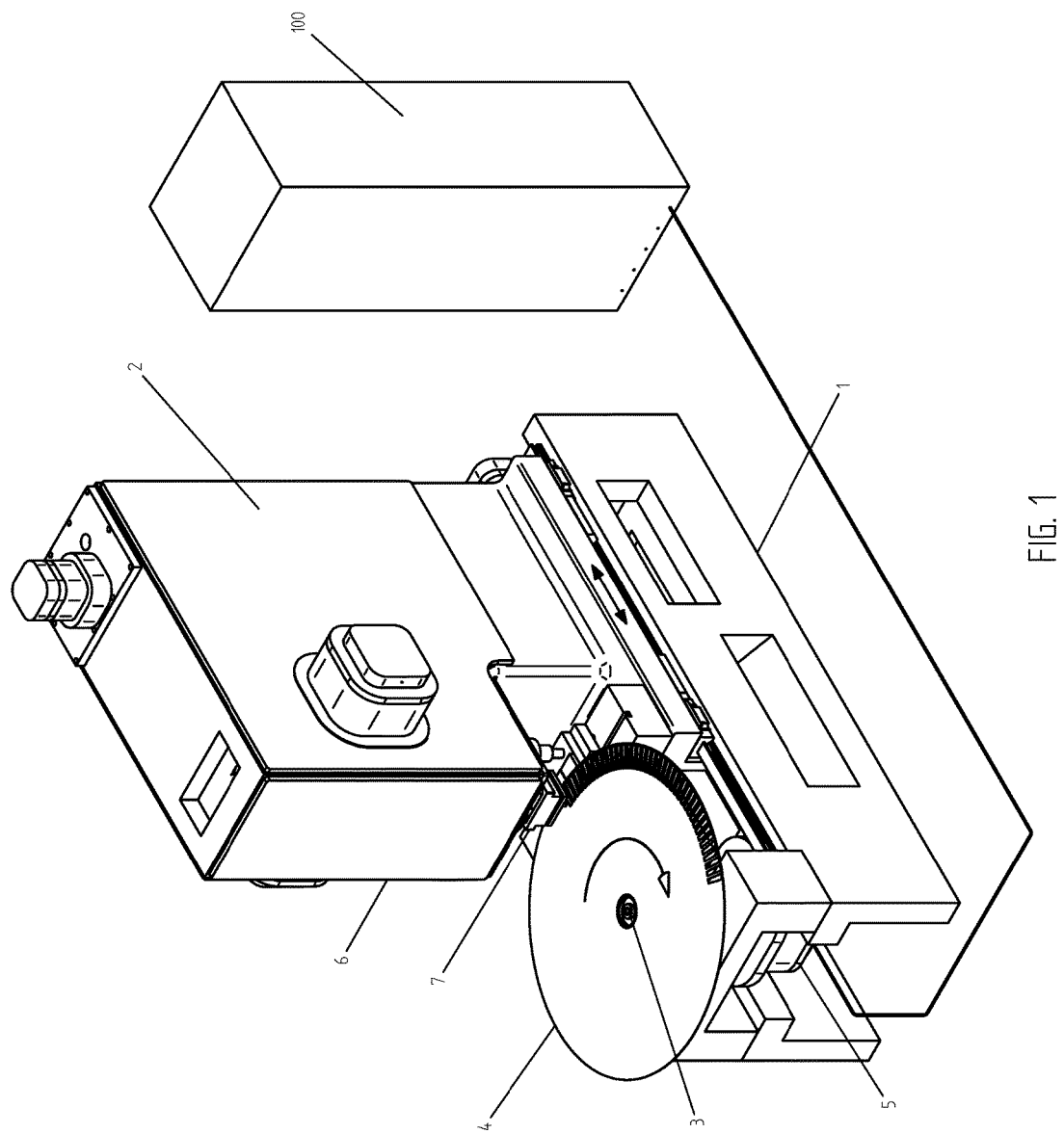
FIG. 1 is an isometric view of the notching press machine according to embodiments of the invention.
Figure 2:
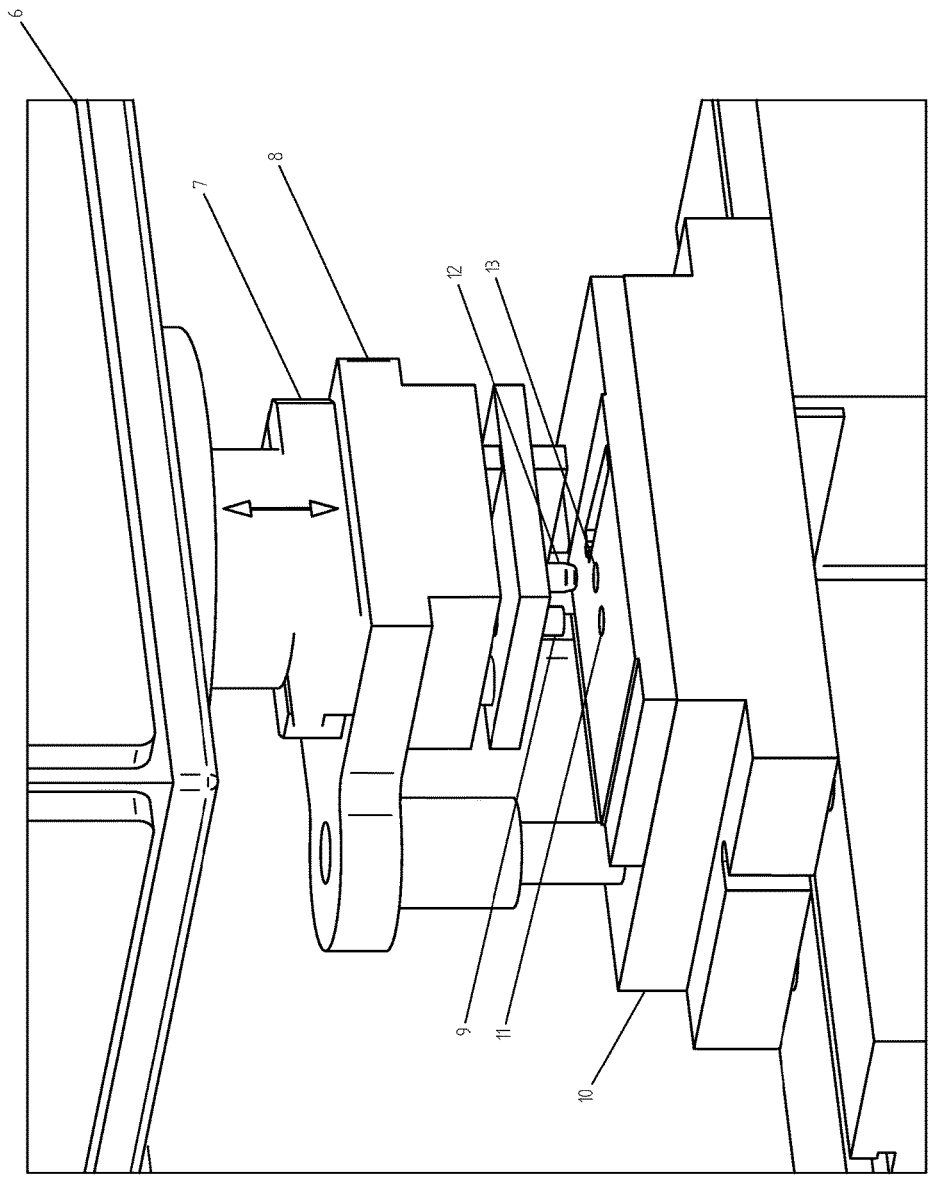
FIG. 2 is a close up view of the notching press machine of FIG. 1
Figure 3:
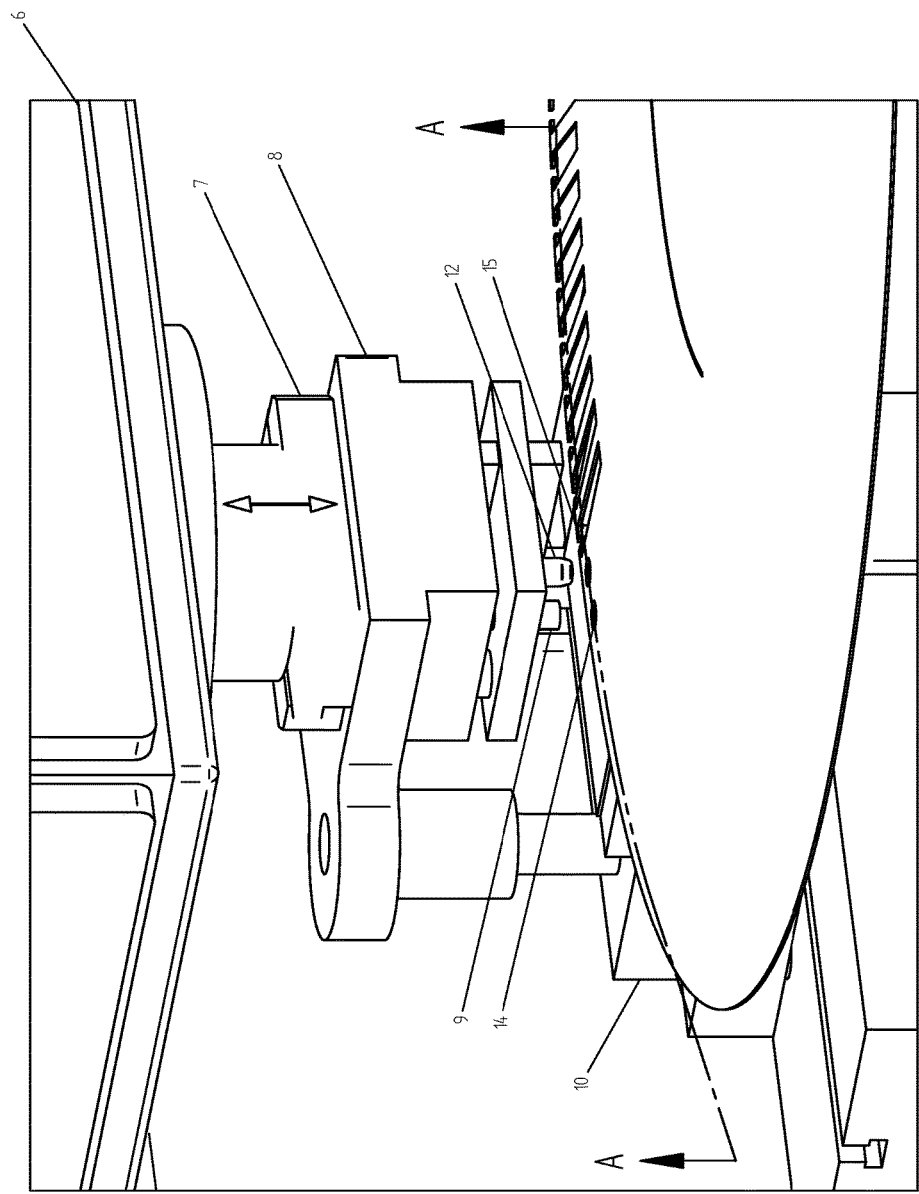
FIG. 3 is a close up view of the notching press machine of FIG. 1 with a lamina workpiece.

The notching press machine further comprises an upper tooling section 8 rigidly supported by press ram 7 which cooperates with a lower tooling section 10 fixedly supported by press frame 6 for punching or processing of workpiece 4.

Upper tooling section 8 comprises a cutting punch 9. Lower tooling section 10 comprises a first die opening 11 aligned with cutting punch 9, which cooperates with cutting punch 9 to cut a hole or cut opening 14 in workpiece 4 as described in the following paragraphs.

Figure 5:
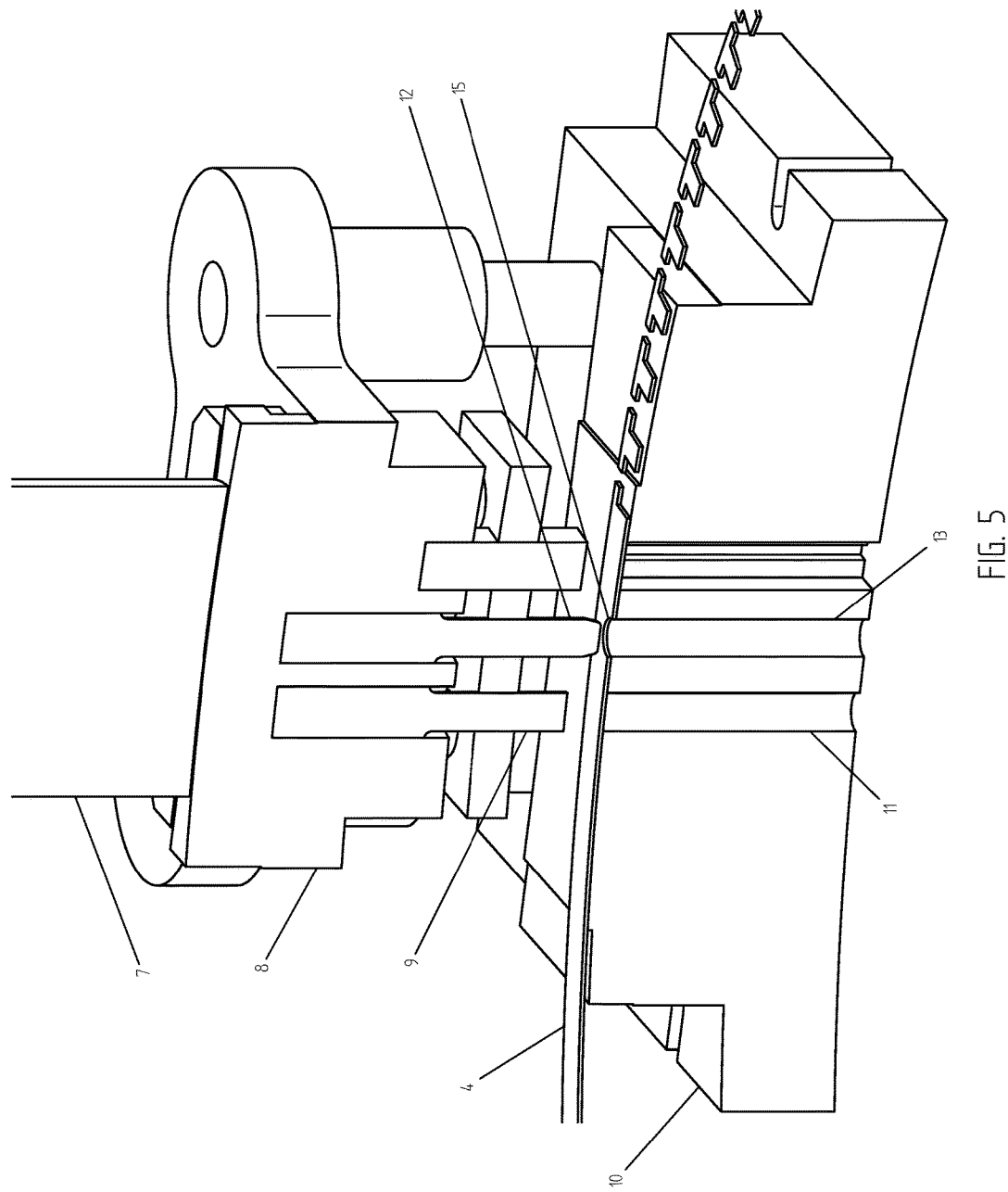
FIG. 5 is cross-sectional view of the notching press machine through line A-A of FIG. 3 showing the notching press machine in an upper or open position.

The steps of manufacturing a lamina workpiece consist of:

A first tool opening step of moving the ram 7 and the upper tooling section 8 to an upper or open position as depicted in FIG. 5.

A workpiece insertion step of inserting a lamina workpiece 4 onto the indexing spindle 3, wherein the workpiece 4 inserted onto the indexing spindle 3 is drivingly attached to the indexing spindle 3 for rotation therewith.

Figure 6:
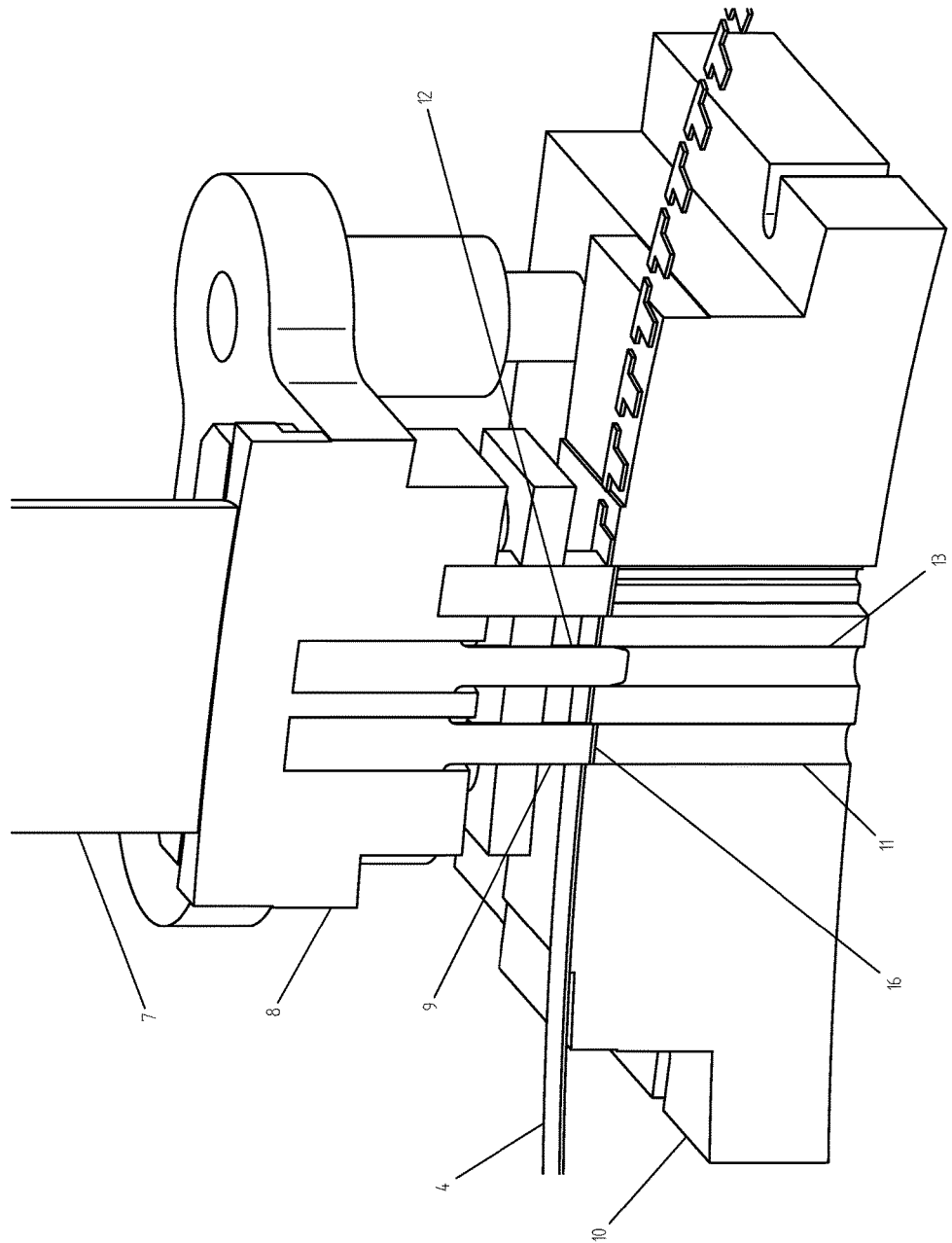
FIG. 6 is cross-sectional view of the notching press showing the notching press machine in working or closed position.

A first stamping step of moving the ram 7 and the upper tooling section 8 to a closed position, depicted in FIG. 6, forcing cutting punch 9 into contact with workpiece 4 and thereby cutting a portion 16 of the lamina workpiece 4 with the cutting punch 9 of upper tooling section 8 and the first die opening 11 of the lower tooling section 10 producing a cut opening 14 in lamina workpiece 4. Cut portion 16 is further forced into die opening 11 so as to remain separated from workpiece 4 in subsequent steps.

A second tool opening step of moving the press ram 7 and the upper tooling 8 section back to the open position (FIG. 5) wherein punch 9 is no longer in contact with workpiece 4.

Figure 4:
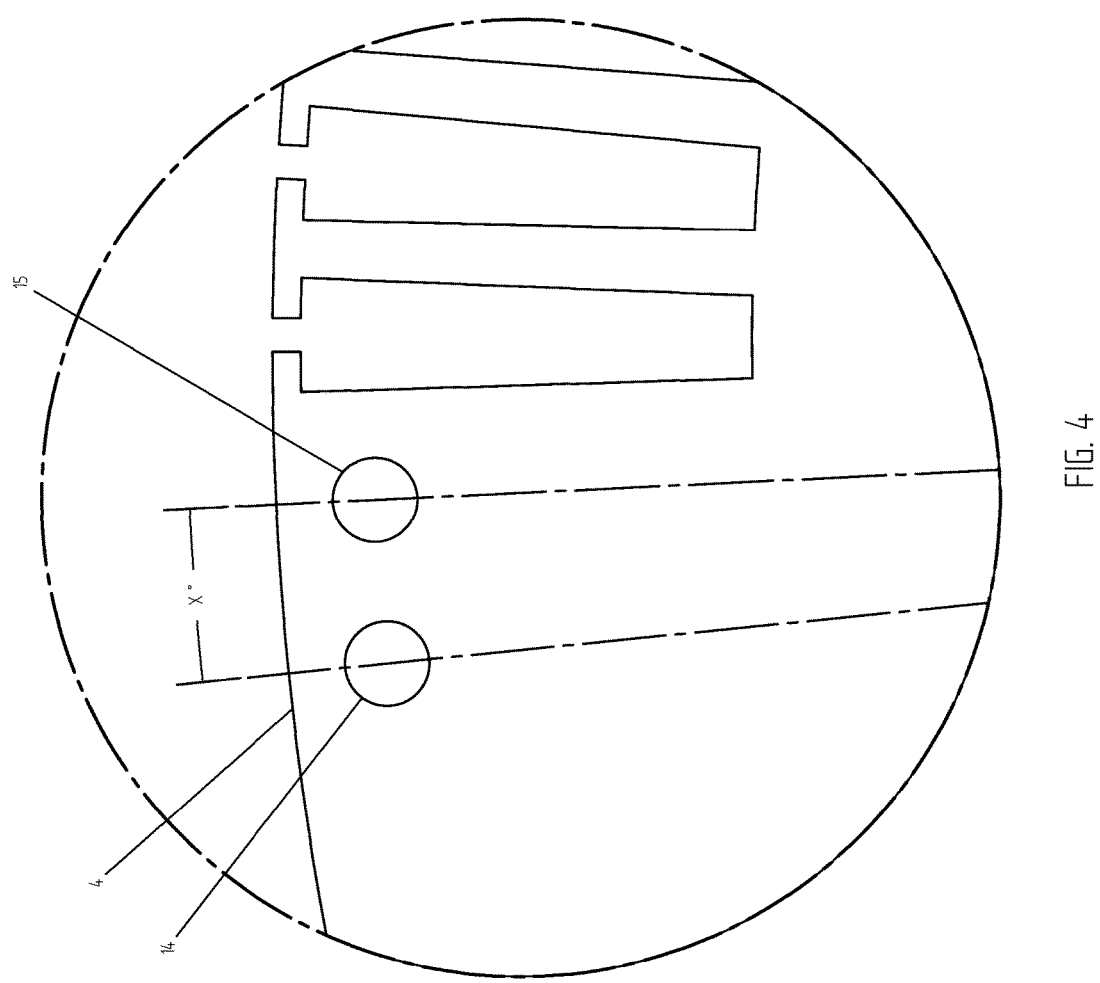
FIG. 4 is a close up view of a portion of a lamina workpiece.

A workpiece rotation step of rotating the index motor 5 drivingly attached to the indexing spindle 3 thru an angle X (FIG. 4) which corresponds to the desired stamping pattern to be produced in workpiece 4.

Ram 7 and upper tooling section 8 are then lowered into a working or closed position (FIG. 6), beginning the repetitive process above. The angle X thru which spindle 3 and attached workpiece 4 are rotated is effected by position controller 100. Position controller 100 and index motor 5 are commonly known in the art, and the details of moving a motor thru a specific angle of rotation will not be described in detail here. However, it should be noted that to produce a movement of index motor 5, spindle 3 and workpiece 4, torque must be produced in the motor (in this case via electrical current) in a manner to cause rotation and stoppage of index motor 5, spindle 3, and workpiece 4 wherein the movement of workpiece 4 is thru an angle X.

The improved method for the manufacturing of lamina workpieces is further characterized in that spindle 3 and index motor 5 are configured such that they are free to rotate without resistance (except for the friction inherent in all mechanical systems) when current is not produced by position controller 100. That is to say, that the torque produced in index motor 5 is a function of the current produced by position controller 100 and can be reduced by a reduction in said current. Torque will be reduced to substantially zero if the current is substantially zero.

In the improved method for the manufacturing of lamina workpieces, upper tooling section 8 further comprises a piloting device 12. Piloting device 12 is a locating mechanism configured for the accurate positioning of the lamina workpiece 4. In the illustrated embodiment, piloting device 12 is in the form of a downwardly projecting locating pin. Lower tooling section 10 also further comprises a second die opening 13 aligned with piloting device 12. Piloting device 12 and second die opening 13 are located in a position relative to cutting punch 9 and first die opening 11 to be substantially aligned with cut opening 14 (produced in the previous stamping step) after rotation of workpiece 4 thru angle X. Cut opening 15 (FIG. 5) corresponds to the previously described cut opening 14 produced in the previous stamping step after completion of rotation of workpiece 4 after rotation thru angle X. That is to say that cut opening 14 is produced in the stamping step, and is then depicted as cut opening 15 after rotation of workpiece 4.

In the improved method for the manufacturing of lamina workpieces the workpiece rotation step described previously is replaced by an improved workpiece rotation step of rotating the index motor 5 drivingly attached to the indexing spindle 3, wherein the cut opening 15 of the lamina workpiece 4 drivingly attached to the indexing spindle 3 is aligned with piloting device 12, and preferably second die opening 13;

The improved method for the manufacturing of lamina workpieces further includes the steps of;

A torque reduction or torque removal step of reducing the torque applied to the index motor 5. In this step, position controller 100 and index motor 5 cooperate to reduce the torque applied to indexing spindle 3 from index motor 5.

Figure 7:
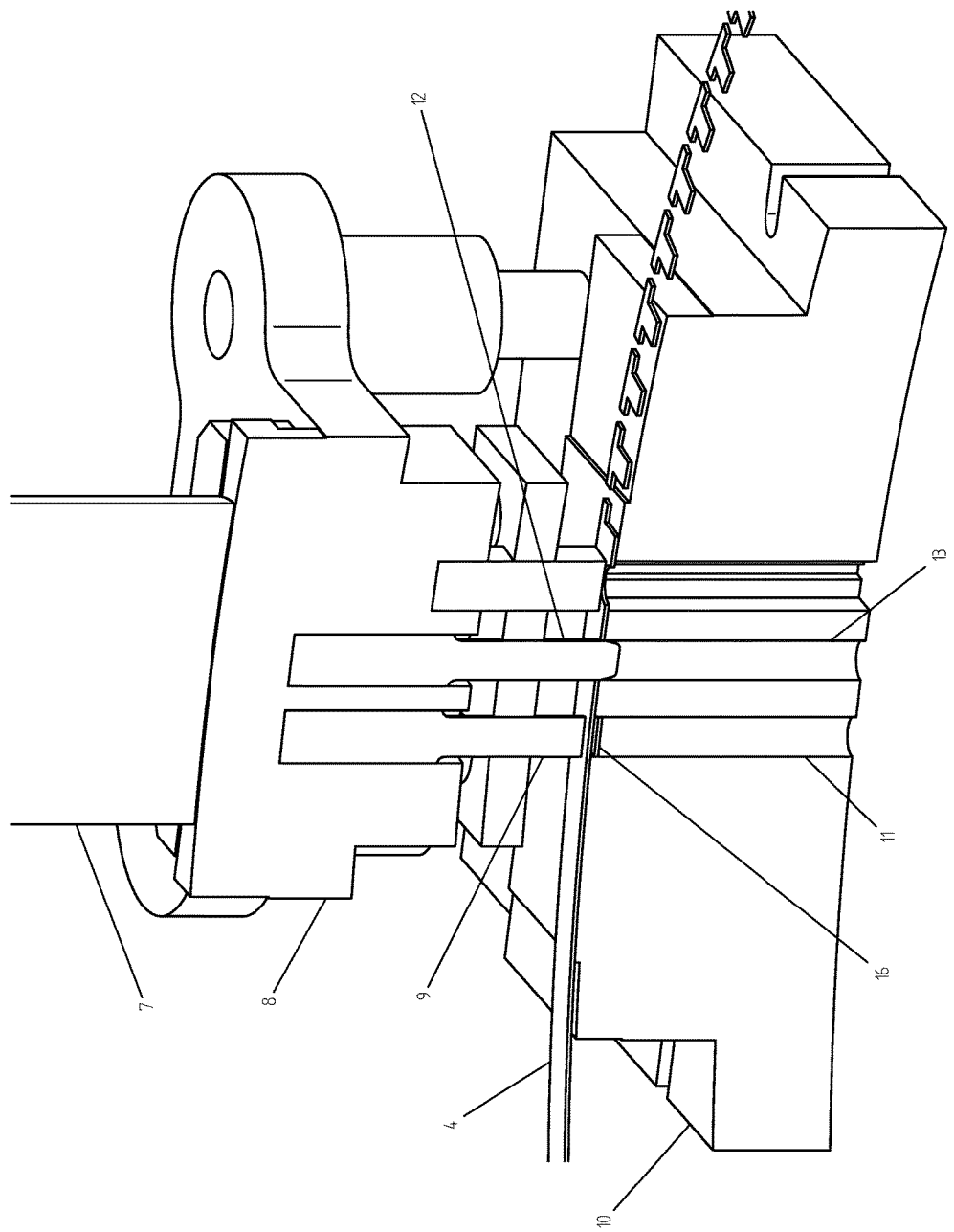
FIG. 7 is cross-sectional view of the notching press machine showing the notching press machine a piloting or intermediate position.

A piloting step of moving the press ram 7 and the upper tooling section 8 to a piloting or intermediate position (FIG. 7) wherein the piloting device 12 cooperates with the cut opening 15 of the workpiece 4 for angular positioning of the lamina workpiece 4.

Ram 7 and tooling section 8 continue moving thru said intermediate position into the first working position, depicted in FIG. 6 producing a new cut opening 14 as described in the first stamping step. Piloting device 12 is constructed such that during the lowering of press ram 7, the intermediate position of press ram 7 and upper tooling 8 occurs just above the first working position and therefore just prior to contact of punch 9 with workpiece 4. Press ram 7 and upper tooling section 8 is then retracted to the upper or open position wherein punch 9 is no longer in contact with workpiece 4 and wherein piloting device 12 is no longer inserted into cut opening 15. The step of rotating indexing spindle 3 and attached workpiece 4 via index motor 5 thru an angle x and all subsequent steps are then repeated until the desired stamping pattern in workpiece 4 has been completed.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A method of notching lamina workpieces with a notching press system, the notching press system comprising a base, a press frame, a ram, an indexing spindle, an index motor drivingly attached to the indexing spindle, an upper tooling section, and a lower tooling section, wherein the upper tooling section is attached to the ram and comprises a cutting punch and a piloting device, wherein the lower tooling section comprises a first die opening aligned with the cutting punch, and a second die opening aligned with the piloting device, the method comprising:

moving the ram and the upper tooling section to an open position;
   inserting a lamina workpiece onto the indexing spindle, wherein the workpiece inserted onto the indexing spindle is drivingly attached to the indexing spindle;
   moving the ram and the upper tooling section to a closed position;
   cutting a portion of the lamina workpiece with the cutting punch of upper tooling section and the first die opening of the lower tooling section to produce a cut opening in the lamina workpiece;
   moving the press ram and the upper tooling section back to the open position;
   rotating the index motor drivingly attached to the indexing spindle, wherein the cut opening of the lamina workpiece drivingly attached to the indexing spindle is aligned with the piloting device;
   reducing the torque applied to the index motor;
   moving the press ram and the upper tooling section to an intermediate position wherein the piloting device cooperates with the cut opening of the workpiece for angular positioning of the lamina workpiece.

2. The method of claim 1, wherein reducing the torque applied to the index motor comprises reducing the torque to substantially zero.

3. The method of claim 1, wherein the piloting device comprises a locating pin, and wherein moving the press ram and the upper tooling section to an intermediate position includes cooperating the locating pin with the second die opening.

4. The method of claim 1, wherein the index motor is an electric servo motor.

* * * * *